(12) United States Patent
Khatri et al.

(10) Patent No.: US 10,802,916 B2
(45) Date of Patent: Oct. 13, 2020

(54) SYSTEM AND METHOD TO ENABLE RAPID RECOVERY OF AN OPERATING SYSTEM IMAGE OF AN INFORMATION HANDLING SYSTEM AFTER A MALICIOUS ATTACK

(71) Applicant: DELL PRODUCTS, LP, Round Rock, TX (US)

(72) Inventors: Mukund P. Khatri, Austin, TX (US); Akkiah C. Maddukuri, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 126 days.

(21) Appl. No.: 15/669,419

(22) Filed: Aug. 4, 2017

(65) Prior Publication Data
US 2019/0042368 A1 Feb. 7, 2019

(51) Int. Cl.
| | | |
|---|---|---|
| *G06F 11/00* | (2006.01) | |
| *G06F 11/14* | (2006.01) | |
| *G06F 9/4401* | (2018.01) | |
| *G06F 21/55* | (2013.01) | |
| *G06F 21/57* | (2013.01) | |
| *G06F 21/56* | (2013.01) | |

(52) U.S. Cl.
CPC .......... *G06F 11/1417* (2013.01); *G06F 9/441* (2013.01); *G06F 9/4406* (2013.01); *G06F 9/4408* (2013.01); *G06F 11/1469* (2013.01); *G06F 21/554* (2013.01); *G06F 21/568* (2013.01); *G06F 21/575* (2013.01); *G06F 2201/805* (2013.01); *G06F 2221/034* (2013.01)

(58) Field of Classification Search
CPC .......................... G06F 11/1417; G06F 9/4406
See application file for complete search history.

(56) References Cited

U.S. PATENT DOCUMENTS

| | | | | |
|---|---|---|---|---|
| 5,388,267 A | * | 2/1995 | Chan ..................... | G06F 9/4403 713/2 |
| 5,542,044 A | * | 7/1996 | Pope ..................... | G06F 21/567 711/163 |
| 6,430,663 B1 | * | 8/2002 | Ding ....................... | G06F 9/441 711/162 |
| 9,329,959 B2 | * | 5/2016 | Kanaya ................... | G06F 11/22 |
| 9,880,908 B2 | * | 1/2018 | Jeansonne ............. | G06F 21/572 |
| 9,990,255 B2 | * | 6/2018 | Jeansonne ............. | G06F 3/0619 |

(Continued)

*Primary Examiner* — Jonathan D Gibson
(74) *Attorney, Agent, or Firm* — Larson Newman, LLP

(57) ABSTRACT

An information handling system includes a central processing unit, multiple storage devices, and a service processor. The central processing unit executes an operating system of the information handling system. The storage devices include a first storage device that stores a primary boot image for the information handling system, and a second storage device. The service processor executes a first boot process. During the first boot process, the service processor stores a recovery boot image on the second storage device, and restarts the first boot process after the recovery boot image being stored on the second storage device. During a second boot process, the service processor removes the second storage device from a bootable device menu in response to the second storage device storing the recovery boot image, and hides the second storage device from being discoverable by the operating system.

17 Claims, 3 Drawing Sheets

(56) References Cited

U.S. PATENT DOCUMENTS

| | | | | |
|---|---|---|---|---|
| 2004/0133790 A1* | 7/2004 | Hensley | ............... | G06F 21/575 |
| | | | | 713/191 |
| 2004/0153733 A1* | 8/2004 | Lin | ............... | G06F 11/1417 |
| | | | | 714/6.12 |
| 2008/0162919 A1* | 7/2008 | Zimmer | ............... | G06F 9/4406 |
| | | | | 713/2 |
| 2012/0023320 A1* | 1/2012 | Chen | ............... | G06F 11/0793 |
| | | | | 713/2 |
| 2013/0339718 A1* | 12/2013 | Kanaya | ............... | G06F 11/3692 |
| | | | | 713/2 |
| 2016/0048397 A1* | 2/2016 | Morales | ............... | G06F 9/441 |
| | | | | 713/2 |
| 2016/0055068 A1* | 2/2016 | Jeansonne | ............... | G06F 21/572 |
| | | | | 714/15 |
| 2019/0042368 A1* | 2/2019 | Khatri | ............... | G06F 11/1417 |

* cited by examiner

SYSTEM AND METHOD TO ENABLE RAPID RECOVERY OF AN OPERATING SYSTEM IMAGE OF AN INFORMATION HANDLING SYSTEM AFTER A MALICIOUS ATTACK

FIELD OF THE DISCLOSURE

The present disclosure generally relates to information handling systems, and more particularly relates to enabling rapid recovery of an operating system image of an information handling system after a malicious attack.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a central processing unit, multiple storage devices, and a service processor. The central processing unit can execute an operating system of the information handling system. The storage devices include a first storage device that can store a primary boot image for the information handling system, and a second storage device. The service processor can execute the boot process. During the first boot process, the service processor can store a recovery boot image on the second storage device, and can restart the first boot process after the recovery boot image is stored on the second storage device. During a second boot process, the service processor can remove the second storage device from a bootable device menu in response to the second storage device storing the recovery boot image, and can hide the second storage device from being discoverable by the operating system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
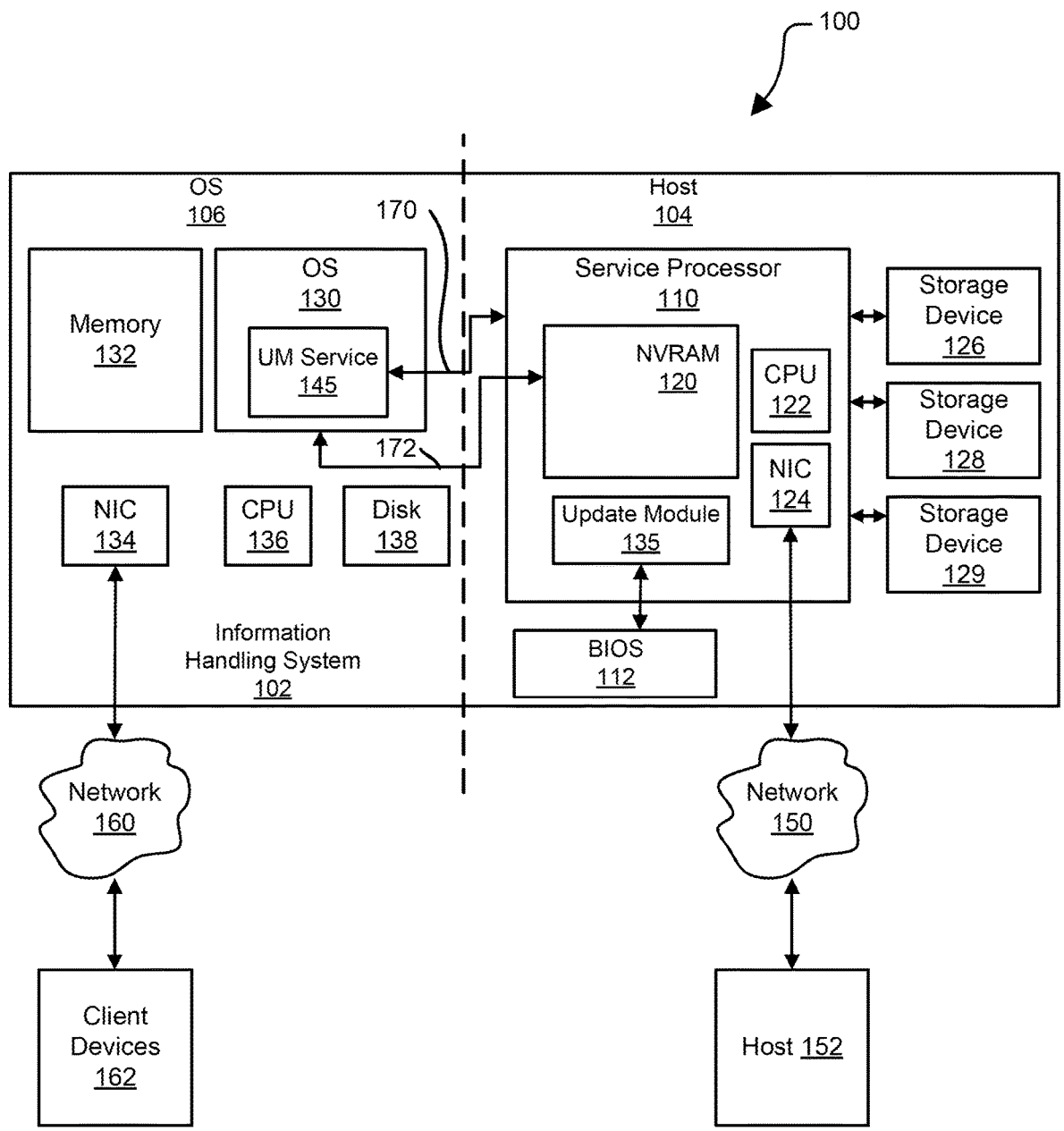
FIG. 1 is block diagram of a system that includes multiple storage devices to store copies of an operating system boot image according to at least one embodiment of the disclosure.

FIG. 1 shows a system 100 including an information handling system 102. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more buses operable to transmit communications between the various hardware components.

FIG. 1 illustrates the system 100 including the information handling system 102, host 152, and client devices 162. In an embodiment, the information handling system 102 can be a server. The information handling system 100 can be divided into a host portion 104 and an operating system (OS) portion 106. The host portion 104 of the information handling system 102 includes a service processor 110 and a basic input/output system (BIOS) 112. The service processor 110 represents an integrated device or devices that is utilized to provide out-of-band management functions to the information handling system 102 that includes management system, and can include a chassis management controller (CMC), a baseboard management controller (BMC), a management engine (ME), an integral part of a Dell remote access controller (DRAC), or an integrated Dell remote access controller (iDRAC), which are systems management hardware and software solutions operable to provide remote management capabilities and that operate according to the an Intelligent Platform Management Interface (IPMI) specification, such as an IPMI Specification V 2.0.

The service processor 110 of the information handling system 102 is connected to the host 152 through network 150, and to other the client devices 162 through the network 160. In some embodiments, the network 150 may comprise an out-of-band management network and the network 160 may comprise a client, OS, or in-band network. Other client devices 162 may be a client device communicating with information handling system 102 or may be another server of the system 100 that operates information handling system 102.

The OS portion 106 of the information handling system 102 includes operating system (OS) 130, a memory 132, a network interface card (NIC) 134, a central processing unit (CPU) 136, and a disk 138. The service processor 110 includes a non-volatile random access memory (NVRAM) 120, a CPU 122, a NIC 124, storage devices 126, 128, and 129, and an update module 135. For purposes of this application, the term NVRAM refers to all non-volatile memory technologies. In an embodiment, the storage devices 126, 128, and 129 can be any type of storage device, such as an internal dual secure digital (SD) module (IDSDM), BOSS memory, or the like.

The service processor 110 may be any system, device, apparatus or component of information handling system 102 configured to permit an administrator or other person to remotely monitor and/or remotely manage information handling system 102 (for example, by an information handling system remotely connected to information handling system 102 via the network 150) regardless of whether information handling system 102 is powered on and/or has an operating system installed thereon. In certain embodiments, the service processor 110 may allow for out-of-band control of information handling system 102. Out-of-band communications refer to communications that may bypass an operating system, such as OS 130. The communications may utilize hardware resources and components that are independent of an operating system. In the embodiment of FIG. 1, network communications to and from the service processor 110 are sent through the NIC 124 that is physically isolated from the in band communication through network interface card 134. The NIC 124 may serve as an interface between the service processor 110 and the network 150. The NIC 124 may enable the service processor 110 to communicate over the network 150 using any suitable transmission protocol and/or standard.

In some embodiments, an administrator may be able to diagnose problems that have caused failure of information handling system 102. In the same or alternative embodiments, the service processor 110 may allow an administrator to remotely manage one or more parameters associated with operation of information handling system 102 such as power usage, processor allocation, memory allocation, or security privileges.

CPU 122 may be communicatively coupled to NVRAM 120, the NIC 124, and update module 135. CPU 122 may also be electrically coupled to a power source dedicated to the service processor 110. CPU 122 may include any system, device, or apparatus configured to interpret and/or execute program instructions and/or process data, and may include, without limitation a microprocessor, microcontroller, or any other digital or analog circuitry configured to interpret and/or execute program instructions and/or process data. In some embodiments, CPU 122 may interpret and/or execute program instructions and/or process data stored in NVRAM 120, update module 135, and/or another component of the service processor 110.

Update module 135 may obtain code for use on information handling system 102. For purposes of this disclosure, code includes software, firmware, and other forms of computer programs. Update module 135 may make the code available to information handling system 102. The code may be updates of previously installed code or may be for initial installation. Some of the code may be downloaded from the host 152 over the network 150. Update module 135 may constitute an advanced embedded system management tool for automated updates of system code, code inventory, code rollback (restoration of code to a previous version), and code correction. Update module 135 may reside in non-volatile memory, such as in NVRAM 120, may be started during a boot sequence, and may function in a pre-operating system environment. In some embodiments, the host 152 may be part of a cloud-computing facility. Cloud computing may refer to the access of computing resources and data via a network infrastructure, such as the Internet. The computing resources and data storage may be provided by linked data centers of the network infrastructure. In many embodiments, cloud computing resources are provided on demand to customers. As a result, the customers may have access to needed computer resources without having to purchase equipment or construct data centers.

Operating system 130 includes update manager service 145. Update manager service 145 is a service or daemon, a computer program that runs as a background process. Daemons may be started at boot time and may respond to network requests, hardware activity, or other programs by performing some task. Daemons may also configure hardware and run scheduled tasks. Update manager service 145 may be created by an operating system vendor or may be installed during the manufacture of information handling system 102.

In the embodiment of FIG. 1, update manager service 145 communicates with the service processor 110 about code, such as device drivers. A device driver may constitute software that acts as an interface between hardware and operating system 130 or another higher-level program. The device driver may communicate with the hardware over a communications bus. It may receive calls from the higher-level program and issue commands to the hardware in response to the commands.

Update manager service 145 may, for example, constantly scan for deployment of new hardware. If it detects new hardware, it may send a message to the service processor 110 to provide device drivers needed for the new hardware. The messages may be sent under a standard management protocol, such as Intelligent Platform Management Interface (IPMI) or WS-Management (WS-Man). Similarly, update manager service 145 may receive messages from the service processor 110 of the availability of code for use by operating system 130, such as the availability of device drivers for newly-installed hardware or updated device drivers and may inform operating system 130.

A primary OS image in one of the storage devices 126, 128, and 129, such as storage device 126. The service processor 110 can then load the primary OS image from the storage device 126 into the BIOS 112, and can start a boot process of the information handling system 102 from the primary boot image. During the boot process, a BIOS setup option can be initiated, and within the BIOS setup option a user can select either storage device 128 or 129 as a recovery target device, such as storage device 128. The service processor 110 can then receive an OS image from the user via an IMPI communication 170, a ME communication 172, or the like from the OS 130. The service processor 110 can store the OS image, received from the OS 130, as a recovery OS image on the selected recovery target device, such as storage device 128. In an embodiment, the recovery OS image can be a recovery OS image, such as a partial OS image, a full OS image, or the like.

After the recovery OS image is stored on the recovery target device, the boot process can be reset. When the boot process comes out of reset the service processor 110 can remove the recovery target, such as storage device 128, from a BIOS bootable device menu. The service processor 110 can also hide the recovery target from the OS 130. In an embodiment, the recovery target can be hidden from the OS 130 by the service processor 110 disabling the drivers from the storage device 128.

The boot process of the information handling system 102 can then be completed, and the information handling system 102 can operate based on the loaded OS 130. During operation of the OS 130, a malicious attack of the OS 130 of the information handling system 102 can detected. After the malicious attack the OS 130 can be corrupted, such that the OS 130 can no longer operate properly. In an embodiment, the malicious attack of the OS 130 can be prevented from causing an attack on the recovery OS image stored in the storage device 128 based on the service processor 110 hiding the storage device 128 from the OS 130. As stated above, the recovery target storage device 128 can be hidden from the OS 130 by the ME driver 172 being disabled. In this situation, when the malicious attack of the OS 130 takes place, the recovery target storage device 128 does not even appear as a storage device within the information handling system 102. Thus, the recovery OS image can remained uncorrupted after any malicious attack. The service processor 110 can then receive an OS recovery request from the host 152. In an embodiment, the OS recovery request can be received via an out-of-band communication.

When the OS recovery request is received, the service processor 110 can unhide the recovery target, such as storage device 128. The service processor 110 can then load the recovery OS image, from the storage device 128, into the BIOS 112. After the recovery OS image is stored in BIOS 112, the service processor 110 can execute a boot process for the information handling system 102 based on the recovery OS image. Thus, the OS 130 can be recovered rapidly after a malicious attack based on the out-of-band communication of the OS recovery request, and the booting of the OS 130 from the recovery OS image stored on the storage device 128. After the OS 130 is booted from recovery OS image, the service processor can re-installed the primary OS image on the storage device 126. In an embodiment, the primary OS image can be re-installed by the service processor 110 repairing the corrupted primary OS image based on the recovery OS image, by the service processor 110 copying the recovery OS image from the storage device 128 and storing the copied recovery OS image as the primary OS image in the storage device 126.

Figure 2:
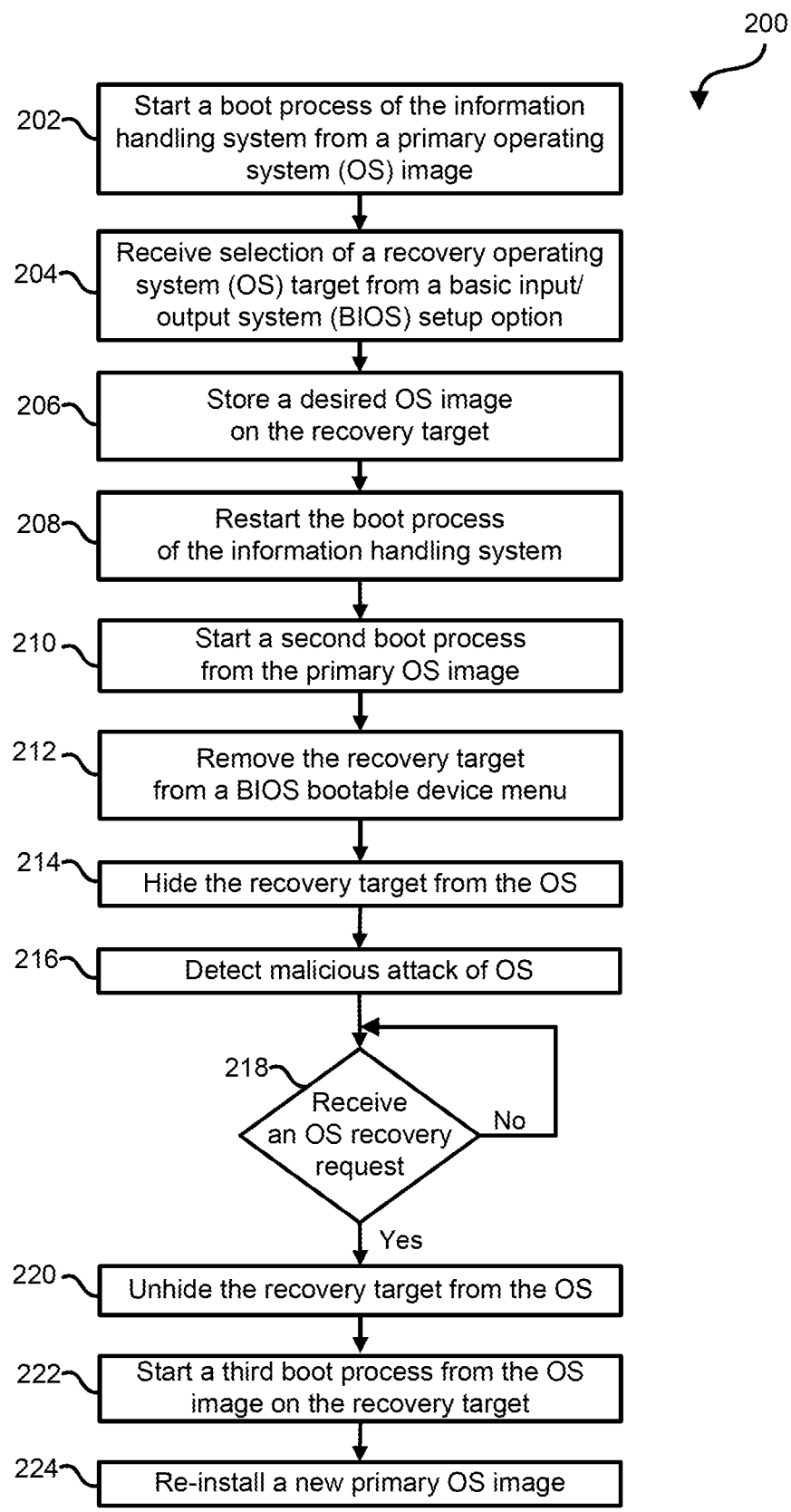
FIG. 2 is a flow diagram of a method for enabling rapid recovery of an operating system image after a malicious attach according to at least one embodiment of the present disclosure.

FIG. 2 illustrates a method 200 for enabling rapid recover of an operating system image of an information handling system after a malicious attack according to at least one embodiment of the present disclosure. At block 202, a first boot process of an information handling system started by a service processor. In an embodiment, the first boot process is executed from a primary operating system (OS) boot image stored on a first storage device of multiple storage devices within the information handling system. In an embodiment, the multiple storage devices can include an IDSDM, a BOSS, or the like. A selection of a recovery OS image target is received from a basic input/output system (BIOS) setup option at block 204. In an embodiment, the recovery OS image target, or recovery target, can be any storage device of the multiple storage devices other than the first storage device. At block 206, a desired OS image is stored on the recovery target. The boot process of the information handling system is restarted at block 208. At block 210, a second boot process of the primary OS image is started.

The recovery target is removed from a BIOS bootable device menu at block 212. At block 214, the recovery target is hidden from being discoverable by the OS. In an embodiment, the recovery target can be hidden by a driver for the recovery target being disabled during the second boot process. A malicious attack of the OS of the information handling system is detected at block 216. At block 218, a determination is made whether an OS recovery request has been received. In an embodiment, the OS recovery request, or recovery mode selection, can be received via an out-of-band communication from an administrator of the information handling system.

When the OS recovery request is received, the recovery target is unhidden from OS of the information handling system at block 220. At block 222, a third boot process is started from the recovery OS image on the recovery target. A new primary OS image is re-installed on the first target at block 224. In an embodiment, the new primary OS image can be that the corrupted primary OS image is patched, that a copy of the recovery OS image is stored as the new primary OS image, or the like.

Figure 3:
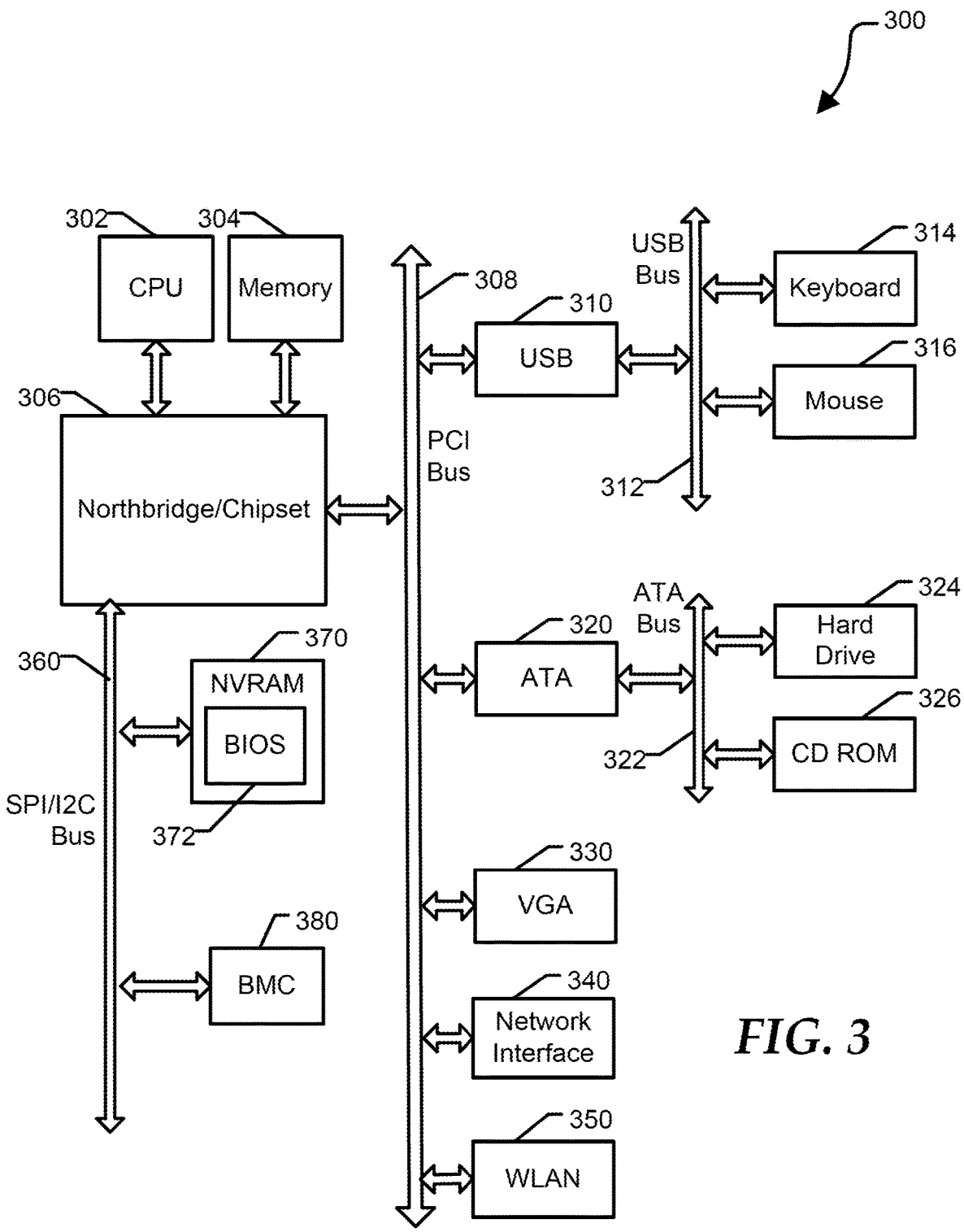
FIG. 3 is a block diagram of a general information handling system according to an embodiment of the present disclosure.

FIG. 3 illustrates a general information handling system 300 including a processor 302, a memory 304, a northbridge/chipset 306, a PCI bus 308, a universal serial bus (USB) controller 310, a USB 312, a keyboard device controller 314, a mouse device controller 316, a configuration an ATA bus controller 320, an ATA bus 322, a hard drive device controller 324, a compact disk read only memory (CD ROM) device controller 326, a video graphics array (VGA) device controller 330, a network interface controller (NIC) 340, a wireless local area network (WLAN) controller 350, a serial peripheral interface (SPI) bus 360, a NVRAM 370 for storing BIOS 372, and a baseboard management controller (BMC) 380. BMC 380 can be referred to as a service processor or embedded controller (EC). Capabilities and functions provided by BMC 380 can vary considerably based on the type of information handling system. For example, the term baseboard management system is often used to describe an embedded processor included at a server, while an embedded controller is more likely to be found in a consumer-level device. As disclosed herein, BMC 380 represents a processing device different from CPU 302, which provides various management functions for information handling system 300. For example, an embedded controller may be responsible for power management, cooling management, and the like. An embedded controller included at a data storage system can be referred to as a storage enclosure processor.

For purpose of this disclosure information handling system 300 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 300 can include processing resources for executing machine-executable code, such as CPU 302, a programmable logic array (PLA), an embedded device such as a System-on-a-Chip (SoC), or other control logic hardware. Information handling system 300 can also include one or more computer-readable medium for storing machine-executable code, such as software or data.

System 300 can include additional processors that are configured to provide localized or specific control functions, such as a battery management controller. Bus 360 can include one or more busses, including a SPI bus, an I2C bus, a system management bus (SMBUS), a power management bus (PMBUS), and the like. BMC 380 can be configured to provide out-of-band access to devices at information handling system 300. As used herein, out-of-band access herein refers to operations performed prior to execution of BIOS 372 by processor 302 to initialize operation of system 300.

BIOS 372 can be referred to as a firmware image, and the term BIOS is herein used interchangeably with the term firmware image, or simply firmware. BIOS 372 includes instructions executable by CPU 302 to initialize and test the hardware components of system 300, and to load a boot loader or an operating system (OS) from a mass storage device. BIOS 372 additionally provides an abstraction layer for the hardware, such as a consistent way for application programs and operating systems to interact with the keyboard, display, and other input/output devices. When power is first applied to information handling system 300, the system begins a sequence of initialization procedures. During the initialization sequence, also referred to as a boot sequence, components of system 300 are configured and enabled for operation, and device drivers can be installed. Device drivers provide an interface through which other components of the system 300 can communicate with a corresponding device.

Information handling system 300 can include additional components and additional busses, not shown for clarity. For example, system 300 can include multiple processor cores, audio devices, and the like. While a particular arrangement of bus technologies and interconnections is illustrated for the purpose of example, one of skill will appreciate that the techniques disclosed herein are applicable to other system architectures. System 300 can include multiple CPUs and redundant bus controllers. One or more components can be integrated together. For example, portions of northbridge/chipset 306 can be integrated within CPU 302. Additional components of information handling system 300 can include one or more storage devices that can store machine-executable code, one or more communications ports for communicating with external devices, and various input and output (I/O) devices, such as a keyboard, a mouse, and a video display. An example of information handling system 300 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 300 can include a set of instructions that can be executed to cause the information handling system to perform any one or more of the methods or computer based functions disclosed herein. The information handling system 300 may operate as a standalone device or may be connected to other computer systems or peripheral devices, such as by a network.

In a networked deployment, the information handling system 300 may operate in the capacity of a server or as a client user computer in a server-client user network environment, or as a peer computer system in a peer-to-peer (or distributed) network environment. The information handling system 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 300 can be implemented using electronic devices that provide voice, video or data communication. Further, while a single information handling system 300 is illustrated, the term "system" shall also be taken to include any collection of systems or sub-systems that individually or jointly execute a set, or multiple sets, of instructions to perform one or more computer functions.

The information handling system 300 can include a disk drive unit and may include a computer-readable medium, not shown in FIG. 3, in which one or more sets of instructions, such as software, can be embedded. Further, the instructions may embody one or more of the methods or logic as described herein. In a particular embodiment, the instructions may reside completely, or at least partially, within system memory 304 or another memory included at system 300, and/or within the processor 302 during execution by the information handling system 300. The system memory 304 and the processor 302 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (such as random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
    a plurality of storage devices including a first storage device to store a primary boot image of an operating system of the information handling system, a second storage device, and a third storage device; and
    a service processor to communicate with the first and second storage devices, and to execute a first boot process, which causes the service processor to:
        execute the first boot process of the primary boot image, so that during the first boot process the service processor:
            initiates a basic input/output system (BIOS) setup option;
            receives, within the BIOS setup option, a user selection of the second storage device as a recovery storage device;
            stores a recovery boot image on the second storage device, wherein the recovery boot image is a partial OS boot image; and
            restarts the first boot process after the recovery boot image is stored on the second storage device; and
        execute a second boot process of the primary boot image, so that during the second boot process the service processor disables a driver for the second storage device to hide the second storage device from being discoverable by the operating system, and removes the second storage device from a bootable device menu.

2. The information handling system of claim 1, the service processor to receive a recovery mode selection via an out-of-band communication, to execute a recovery boot process from in response to the recovery mode selection being received, during the recovery boot process, the service processor to: unhide the second storage device, boot to the recovery boot image on the second storage device, and configure the operating system of the information handling system based on the recovery boot image.

3. The information handling system of claim 2, the service processor to store the recovery boot image as the primary boot image on the first storage device after the operating system of the information handling system is configured during the recovery boot process.

4. The information handling system of claim 2, the service processor to patch the primary boot image on the first storage device based on the recovery boot image after the operating system of the information handling system is configured during the recovery boot process.

5. The information handling system of claim 1, the service processor further to provide a basic input/output setup option during the first boot process, and to receive the recovery boot image during the basic input/output setup option prior to the recovery boot image being stored on the second storage device.

6. The information handling system of claim 1, wherein each of the storage devices is a different type of storage device.

7. A method comprising:
    executing, by a service processor, a first boot process of an information handling system, wherein the first boot process is executed from a primary boot image of an operating system stored on a first storage device of the information handling system, wherein the information handling system further includes a second storage device and a third storage device, during the execution of the first boot process:
- the service processor initiates a basic input/output system (BIOS) setup option, receives, within the BIOS setup option, a user selection of the second storage device as a recovery storage device, and stores a recovery boot image on the second storage device, wherein the recovery boot image is a partial OS boot image; and
- the first boot process restarts after the recovery boot image is stored on the second storage device; and executing, by the service processor, a second boot process of the primary boot image, so that during the second boot process:
- the second storage device is removed from a bootable device menu in response to the second storage device storing the recovery boot image; and
- a driver for the second storage device is disabled to hide the second storage device from discovery by the operating system.

8. The method of claim 7 further comprising:
receiving a recovery mode selection via an out-of-band communication,
executing a recovery boot process from in response to the recovery mode selection being received, during the recovery boot process:
- unhiding the second storage device;
- booting to the recovery boot image on the second storage device; and
- configuring the operating system of the information handling system based on the recovery boot image.

9. The method of claim 8 further comprising:
storing the recovery boot image as the primary boot image on the first storage device after the operating system of the information handling system is configured during the recovery boot process.

10. The method of claim 8 further comprising:
patching the primary boot image on the first storage device based on the recovery boot image after the operating system of the information handling system is configured during the recovery boot process.

11. The method of claim 7 further comprising:
providing a basic input/output setup option during the first boot process, and to receive the recovery boot image during the basic input/output setup option prior to the recovery boot image being stored on the second storage device.

12. The method of claim 7 wherein each of the storage devices is a different type of storage device.

13. An information handling system comprising:
a central processing unit to execute an operating system of the information handling system;
a plurality of storage devices including a first storage device to store a primary boot image for the information handling system, a second storage device, and a third storage device; and
a service processor to communicate with the central processing unit and with the plurality of storage devices, to execute a first boot process, which causes the service processor to:
execute the first boot process of the primary boot image, during the first boot process, the service processor to:
- initiate a basic input/output system (BIOS) setup option;
- receive, within the BIOS setup option, a user selection of the second storage device as a recovery storage device;
- store a recovery boot image on the second storage device, wherein the recovery boot image is a partial OS boot image; and
- restart the first boot process after the recovery boot image being stored on the second storage device; and
execute a second boot process of the primary boot image, during the second boot process, the service processor to:
- remove the second storage device from a bootable device menu in response to the second storage device storing the recovery boot image; and
- disable a driver for the second storage device, wherein the second storage device is not accessible by the service processor in response to the driver being disabled.

14. The information handling system of claim 13, the service processor to receive a recovery mode selection via an out-of-band communication, to execute a recovery boot process from in response to the recovery mode selection being received, during the recovery boot process, the service processor to: unhide the second storage device, boot to the recovery boot image on the second storage device, and configure the operating system of the information handling system based on the recovery boot image.

15. The information handling system of claim 14, the service processor to store the recovery boot image as the primary boot image on the first storage device after the operating system of the information handling system is configured during the recovery boot process.

16. The information handling system of claim 14, the service processor to patch the primary boot image on the first storage device based on the recovery boot image after the operating system of the information handling system is configured during the recovery boot process.

17. The information handling system of claim 13, the service processor further to provide a basic input/output setup option during the first boot process, and to receive the recovery boot image during the basic input/output setup option prior to the recovery boot image being stored on the second storage device.

* * * * *